United States Patent
Kunieda et al.

(10) Patent No.: US 6,177,132 B1
(45) Date of Patent: Jan. 23, 2001

(54) OPTICAL RECORDING MEDIUM AND METHOD OF ITS MANUFACTURE

(75) Inventors: Toshiaki Kunieda, Minoo; Sadayuki Okazaki, Hirakata; Toshibumi Kamiyama, Tsuyama, all of (JP)

(73) Assignee: Matsushita Electric Industrial Co., Ltd., Osaka (JP)

( * ) Notice: Under 35 U.S.C. 154(b), the term of this patent shall be extended for 0 days.

(21) Appl. No.: 09/194,581

(22) PCT Filed: Mar. 30, 1998

(86) PCT No.: PCT/JP98/01422

§ 371 Date: Nov. 30, 1998

§ 102(e) Date: Nov. 30, 1998

(87) PCT Pub. No.: WO98/44497

PCT Pub. Date: Oct. 8, 1998

(30) Foreign Application Priority Data

Mar. 31, 1997 (JP) .................................................. 9-079453

(51) Int. Cl.[7] .................................................. C23C 16/00
(52) U.S. Cl. .......................... 427/162; 427/294; 427/296; 428/64.4; 428/457; 428/913; 430/270.14; 430/495.1; 430/945

(58) Field of Search .................................. 428/64.1, 64.2, 428/64.4, 64.8, 457, 913; 430/270.14, 495.1, 945; 369/283; 427/447, 497, 162, 255.2, 294, 296

(56) References Cited

PUBLICATIONS

Patent Abstracts of Japan, abstract of Japanese Patent Kokai Publication (JP–A) No. 09–007237 (Jan. 1997).
Patent Abstracts of Japan, abstract of Japanese Patent Kokai Publication (JP–A) No. 62–075948 (Apr. 1987).
Patent Abstracts of Japan, abstract of Japanese Patent Kokai Publication (JP–A) No. 04–193588 (Jul. 1992).
Patent Abstracts of Japan, abstract of Japanese Patent Kokai Publication (JP–A) No. 59–131493 (Jul. 1984).

*Primary Examiner*—Elizabeth Evans
(74) *Attorney, Agent, or Firm*—Wenderoth, Lind & Ponack, L.L.P.

(57) ABSTRACT

In a method for producing an optical recording medium by forming a recording film on a substrate by means of vapor deposition of a pigment material in a high vacuum condition, the temperature (° C.) of an evaporation vessel for heating and evaporating the pigment material is not more than 2.5 times as high as the evaporation starting temperature of the pigment material.

10 Claims, 3 Drawing Sheets

OPTICAL RECORDING MEDIUM AND METHOD OF ITS MANUFACTURE

FIELD OF THE INVENTION

The present invention relates to an optical recording medium, and more particularly to an optical recording medium (or optical recording disk) on which data (or information) can be recorded and from which the recorded data can be read out (or reproduced) by using a semiconductor laser, the optical recording medium having on a substrate, a recording film formed of a compound known as a pigment material that exhibits a particularly large absorption at a specific wavelength region, for example 400 to 800 nm (for example, that absorbs light having a wavelength in this region at a relatively large amount), and a production method of the optical recording medium.

BACKGROUND ART

As an optical recording medium as described above, an optical disk (the so-called CD-R disk) of "write-once" type is practically available into which a user can write (or record) data only once. This optical recording medium Attachment A includes a recording film made of a pigment material, for example, an organic pigment material such as a cyanine based compound, a phthalocyanine based compound and so on.

In order to form the recording film on a substrate in the production of the optical disk as described above, a spin coating method is generally employed in which a pigment material is dissolved in a solvent to obtain a solution, which is applied onto the substrate by means of a spin coater and dried.

The recording film formed as described above generally has a thickness of 0.1 to 0.3 μm, and uniformity of thickness over the entire surface of the substrate is required. In order to meet this requirement, various measures are proposed such as developments of techniques for applying the pigment material including selection of solvents and precise control of a rotating table of the spin coater as well as thorough management of a surrounding atmosphere for performing the coating process and surface conditions of the substrate.

However, with the spin coating method as mentioned above, it is not easy to control thickness variation of the recording film among individual disks and/or thickness variation of the recording film within a single disk within a given degree by means of the conventional technique for forming the recording film or the management of the surrounding atmosphere for forming the recording film as described above when the thickness of the recording film to be formed is smaller, for example, near 0.1 μm.

Also, the spin coating method has an inherent problem that the thickness of the recording film changes along a radial direction of the disk, namely that the thickness of the recording film to be formed tends to be larger on an outer peripheral side than on an inner peripheral side of the disk. This renders it extremely difficult to stably form a recording film having a thickness which is uniform among individual disks or within a single disk.

Further, instead of the above-mentioned spin coating method, there is known a method of producing the optical recording medium characterized by forming the recording film on the substrate by means of a vacuum deposition method which is one of the so-called dry processes. It is expected that this method would improve the uniformity of the thickness of the recording film to be formed. However, this method involves other problems such as low productivity and dust adhesion. Therefore, in order to efficiently perform the vacuum deposition method, it is desired that these problems are at least suppressed or preferably substantially solved.

DISCLOSURE OF THE INVENTION

The purpose of the present invention is to alleviate the above-mentioned problems or preferably to substantially solve them. The present invention aims at suppressing variation in performance of the recording medium due to the variation in the thickness of the recording film among individual optical recording media and/or over a single optical recording medium, and thereby suppressing or eliminating the variation (or fluctuation) of the thickness of the recording film, hence the variation in performance, preferably to such a degree that substantially no problem occurs upon using the optical recording medium. In other words, the purpose of the invention is to provide an optical recording medium with improved quality and stability, thus being suitable for mass production, as well as a method of producing the optical recording medium.

The means provided by the present invention for solving the problems in order to achieve the above-mentioned object resides in a process of forming a recording film made of a pigment (or dye) material on a substrate by vapor deposition, wherein the pigment material is evaporated at a temperature of an evaporation vessel containing the pigment material, and then deposited on the substrate, the temperature being not less than an evaporation starting temperature of the pigment material and not more than 2.5 times as high as the evaporation starting temperature. It is noted that the temperature as used in this specification refers to a temperature expressed in Celsius scale (° C).

Thus, according to the first aspect of the present invention, there is provided a method of producing an optical recording medium including a recording film on a substrate by means of vapor deposition of a pigment material on the substrate under a high vacuum, the method comprising the step of heating an evaporation vessel containing the pigment material to a temperature which is not less than an evaporation starting temperature of the pigment material (i.e. a temperature at which the pigment material starts to evaporate) and not more than 2.5 times as high as the evaporation starting temperature of the pigment material, and preferably to a temperature which is 1.2 to 2.3 times as high as the evaporation starting temperature, whereby the pigment material is evaporated and then deposited on the substrate.

In other words, the present invention provides a method of producing an optical recording medium, for example, a recording medium of the "write-once" type, comprising the steps of:

(1) forming the recording film on the substrate as described above, (2) forming a reflective film on the recording film, and (3) forming a protective film on the reflective film.

Therefore, the state of the substrate on which the recording film is formed (i.e. the substrate having the recording film thereon) can be regarded as a precursor of the optical recording medium (a preliminary optical recording medium).

The steps (2) and (3) can be performed by means of a known method using a known material.

According to the second aspect of the present invention, there is provided an optical recording medium (for example, CD-R or DVD-R) comprising a recording film with improved uniformity of its thickness formed by means of vapor deposition of a pigment material onto a substrate under a high vacuum, wherein the pigment material is evaporated and then deposited on the substrate by heating an evaporation vessel which contains the pigment material to a temperature which is not less than an evaporation starting temperature of the pigment material (a temperature at which the pigment material starts to evaporate) and not more than 2.5 times as high as the evaporation starting temperature of the pigment material.

In other words, the present invention provides an optical recording medium comprising the recording film formed on the substrate by the above-mentioned method of the present invention, a reflective film formed on the recording film and a protective film formed on the reflective film.

It is noted that the uniformity of thickness of the recording film as used in the present invention refers to a state in which the variation of the thicknesses of the recording film among individual optical recording media or the variation of the thickness within a single optical recording medium, and preferably both of these variations are approximately the same as, preferably smaller than the variation of the thickness of the optical recording medium (or media) produced by the conventional spin coating method. Concretely, the present invention can reduce the variation in the thickness of the recording film of the optical recording medium to about ±10% or less, and preferably about ±5% or less of a given thickness to be formed, although the variation changes in accordance with the given thickness of the recording film to be formed.

In the present invention, it is sufficient that the evaporation vessel which contains the pigment material is an element having a function to support and heating the pigment material so that the pigment material is evaporated. Therefore, in principle, a material, a shape, a size, and the like of the evaporation vessel is not specifically limited. For example, the evaporation vessel may be a plate form, a boat form, a box form, or a tubular form.

In the present invention, the evaporation and the deposition of the pigment material are typically performed under the high vacuum. The concrete degree of vacuum that can be used may be an operation pressure that is usually used upon forming the recording film by the vacuum deposition of the pigment material. For example, the degree of vacuum may be suitably selected to be not more than $10^{-3}$ Torr, and preferably within the range of $10^{-4}$ to $10^{-7}$ Torr, depending on the pigment material to be used, the thickness of the recording film to be formed, and the like.

BRIEF DESCRIPTION OF THE DRAWINGS

The above and further objects and features of the invention will more fully be apparent from the following detailed description with accompanying drawings, in which.

In the drawings, reference numerals represent the following elements:
1 . . . loading chamber, 2 . . . surface treatment chamber, 3 . . . recording film forming chamber, 4 . . . reflective film forming chamber, 5 . . . withdrawal chamber, 6 . . . gate valve, 7 . . . introduction door, 8 . . . withdrawal door, 9 . . . gas-evacuation device, 10 . . . substrate, 11 . . . substrate holder, 12 . . . heating lamp, 13 . . . discharging electrode, 14 . . . pigment material, 15 . . . evaporation vessel, 16 . . . heater, 17 . . . reflective film material, 18 . . . evaporation vessel, 19 . . . heater, 20 . . . recording film, 21 . . . reflective film, 22 . . . protective film.

DETAILED DESCRIPTION OF THE INVENTION

In the present invention, the pigment material is a material which constitutes the recording film of the optical recording medium, which film is formed as a layer for recording data in the optical recording medium. More concretely, the pigment material refers to a material which is capable of forming recording pits on the recording film by being transformed with a laser beam having a specific wavelength and which is capable of allowing data recorded on the recording film to be read out by irradiation of a laser beam having a specific wavelength on the recording film and detection of reflected light.

Preferably, the pigment material as used in the present invention may be preferably an organic pigment material that is used for the recording film of the optical recording medium. Examples of the pigment material include an azo based, a phthalocyanine based, an anthraquinone based, a pyridylazo based, a porphyrin based, a perylene based, a quinacridone based, a pyrrolopyrrole based, a merocyanine based, a styryl based, a Rhodamine based, a resorufine based, and an alizarin based pigment materials.

In the present invention, the temperature of the evaporation vessel which contains the pigment material refers to a temperature of at least a portion of the vessel that supports the pigment material, the portion substantially contributing to the heating of the pigment material so as to evaporate the pigment material. Typically, such a portion of the evaporation vessel may be a portion which is in contact with the pigment material or may be a portion which is in contact with the pigment material as well as its vicinity. For example, the temperature of the evaporation vessel may be a temperature of a portion of a bottom surface of a container into which the pigment material is charged, on which portion the pigment material is positioned.

In the present invention, the evaporation starting temperature of the pigment material refers to a temperature of the evaporation vessel (a temperature of the portion of the evaporation vessel which portion is in contact with the pigment material positioned in the evaporation vessel, i.e. a temperature at which the pigment material is heated) at which temperature a recording film formation speed just exceeds 1 (Å/sec) when the evaporation vessel is gradually heated while measuring the recording film formation speed by means of an evaporation rate monitor of a quartz oscillator type (an apparatus for measuring a thickness of the film formed on the substrate, manufactured by Nippon Shinkuu Gijutsu Co., Ltd., trade name: CRTM-5000), the temperature being measured by a thermocouple embedded in the evaporation vessel upon forming the recording film by the vapor deposition of the pigment material on the substrate (which is made of a polycarbonate and which is at a temperature of 50° C. or less) for the optical recording medium, the substrate being located 30 cm above the evaporation vessel (for example, a boat form vessel made of molybdenum) when the pigment material is charged into the evaporation vessel and evaporated by heating the evaporation vessel in a chamber maintained at a vacuum degree of $1\times10^{-4}$ Torr or less.

The present invention ensures comparatively mild heating of the pigment material and prevents rapid heating of the pigment material in performing the vacuum deposition by heating the evaporation vessel containing the pigment material to the temperature which is not less than the evaporation starting temperature of the pigment material and not more than 2.5 times as high as the evaporation starting temperature of the pigment material as described above. As a result, the recording film can be formed substantially by the molecular (at a molecular level) on the substrate, thereby forming a recording film with improved uniformity over the entire substrate even in the case where the recording film is to be formed with a thickness in the order of $\frac{1}{10}$ μm (for example, a thickness in the range of 0.1 μm to 0.3 μm).

In a more preferable embodiment, the temperature for heating the evaporation vessel is 1.5 to 2.3 times, especially 1.8 to 2.2 times, and for example about 2 times as high as the evaporation starting temperature of the pigment material, taking account of the speed at which the film is formed (hence the period of time required for producing the optical recording medium). Such a temperature of heating the evaporation vessel particularly properly applies to the case in which the recording film is to be formed using a phthalocyanine based pigment (e.g. copper phthalocyanine), a porphyrin based pigment, a Rhodamine based pigment, a metal-containing azo based pigment, a perylene based pigment, a quinacridone based pigment, a pyrrolopyrrole based pigment, a merocyanine based pigment, and the like as the pigment material (see, for example, Table 1 shown below).

In the present invention, in the case where the temperature for heating the evaporation vessel is less than 2.5 times as high as the evaporation starting temperature of the pigment material, the recording film can be generally formed in a necessary step period ("Takt") which is approximately the same as that for the spin coating method, if the temperature for heating the evaporation vessel is more than about 1.5 to 2.0 times as high as the evaporation starting temperature of the pigment material depending on the pigment material to be used, the emissivity of the evaporation vessel as mentioned below, and the like. Also, in the case where the temperature for heating the evaporation vessel is less than 2.5 times as high as the evaporation starting temperature of the pigment material, it is possible to prevent generation of splashes that is considered to appear due to unbalance between the temperature of the evaporation vessel and the temperature of the pigment material in the evaporation vessel, thereby reducing dust adhesion caused by the splashes.

In a preferred embodiment of the present invention, regarding the evaporation vessel for supporting the pigment material, the emissivity of a portion contributing to the heating of the pigment material, typically at least a portion of the surface which is brought into contact with the pigment material, preferably a surface which is brought into contact with the pigment material and its surrounding surface, and generally a surface which defines a part of the evaporation vessel into which part the pigment material is charged (hence a surface of the evaporation vessel) may be at least 0.1, preferably at least 0.2, and more preferably at least 0.3, whereby the pigment material can be efficiently heated. Here, the term "emissivity" as used herein refers to a ratio of energy emitted by an object relative to the energy emitted by the perfect blackbody.

When the surface emissivity of the evaporation vessel is at least 0.1, it is possible to transfer heat to the pigment material efficiently even under vacuum, thereby reducing the unbalance between the temperature of the evaporation vessel and the temperature of the pigment material, and further decreasing the amount of generated splashes. Concretely, it is possible to use a metal such as molybdenum, tantalum, or tungsten, an oxide thereof, a ceramic material, or the like as the material for the evaporation vessel. Any combination of these materials (for example, an embodiment in which only a surface portion of the boat-like evaporation vessel of tungsten on which the pigment material is supported is oxidized) may be employed.

In another preferable embodiment of the present invention, the vessel for supporting the pigment is directly heated electrically. For example, the vessel itself is heated by the Joule's heat generated by allowing an electrical current to pass directly through the evaporation vessel. This increases the speed of heat transfer to the pigment material, improving an evaporation response and facilitating the control of the evaporation rate. When the evaporation vessel is heated indirectly, it requires a heating source of a higher temperature as compared with the direct heating. However, the heating source of the higher temperature is not necessarily preferable in order to ensure moderate heating. Therefore, taking this into account, the direct heating is advantageous.

Concretely, the evaporation vessel may be, for example, a boat form vessel (a generally elongated or rectangular plate having a recess in its central portion for supporting the pigment material) which has a structure such that the plate is directly heated by connecting both ends of the plate to an electric current source for allowing an electric current to pass through the plate. It is of course possible that the evaporation vessel may be heated indirectly (for example, by embedding a heater in the evaporation vessel).

The present invention will be further explained in detail with reference to the drawings.

Figure 1A:
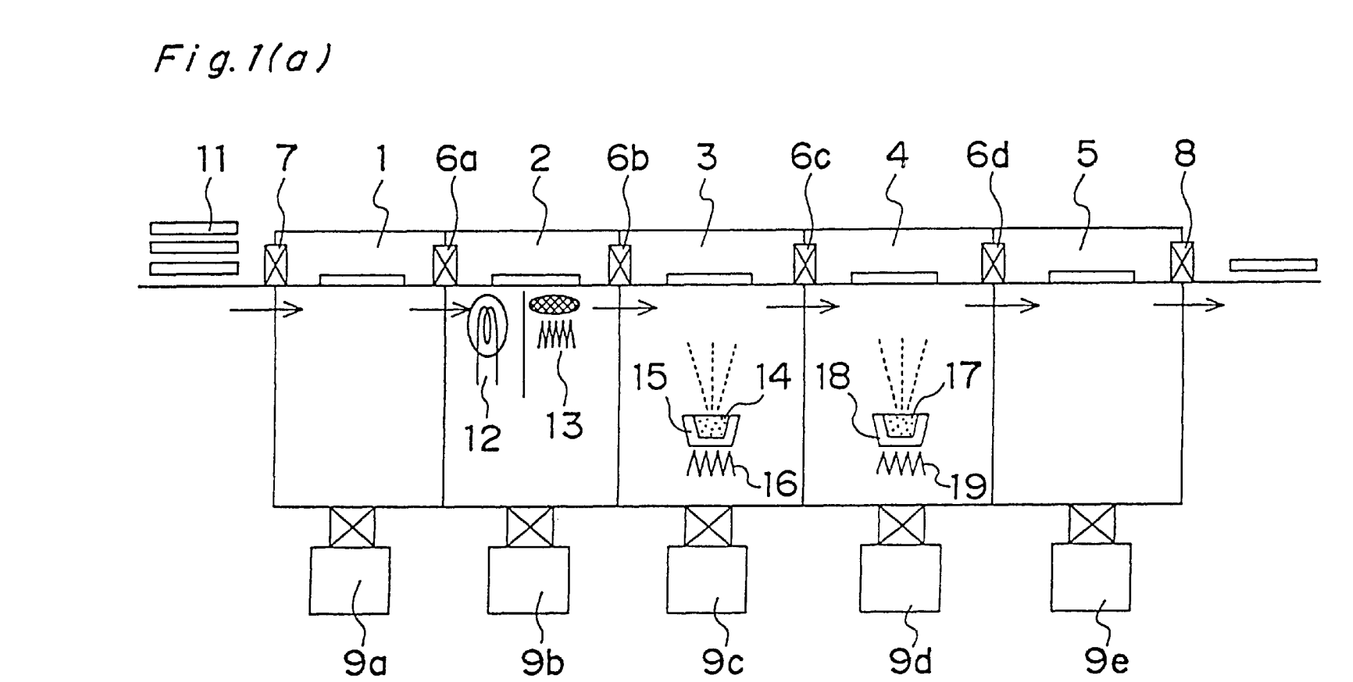
FIG. 1(a) is a schematic view illustrating a construction of an apparatus for forming a recording film in producing an optical recording medium while employing a method of the present invention.

FIG. 1(a) shows a view schematically illustrating an apparatus for forming a recording film on a plastic substrate (a substrate generally used for an optical recording medium, for example a polycarbonate substrate) upon producing an optical recording medium.

The film-forming apparatus is an apparatus referred to as an "inline type" having a five chamber structure including a loading chamber (or preliminary chamber) 1, a surface treatment chamber 2, a recording film formation chamber 3 for forming a recording film of a pigment material, a reflective film forming chamber 4, and a withdrawal chamber 5. Gate valves 6a, 6b, 6c, and 6d are provided on partitions between adjacent chambers; an introduction door 7 is provided with the loading chamber 1, and a withdrawal door 8 is provided with the withdrawal chamber 5. The chambers are equipped with gas evacuation devices 9a, 9b, 9c, 9d, and 9e, respectively, and thereby gas can be evacuated so as to independently maintain a given degree of vacuum. A substrate holder 11 loaded with a plurality of the substrates is allowed to pass through these chambers successively to convey the substrates through the apparatus.

Figure 1B:
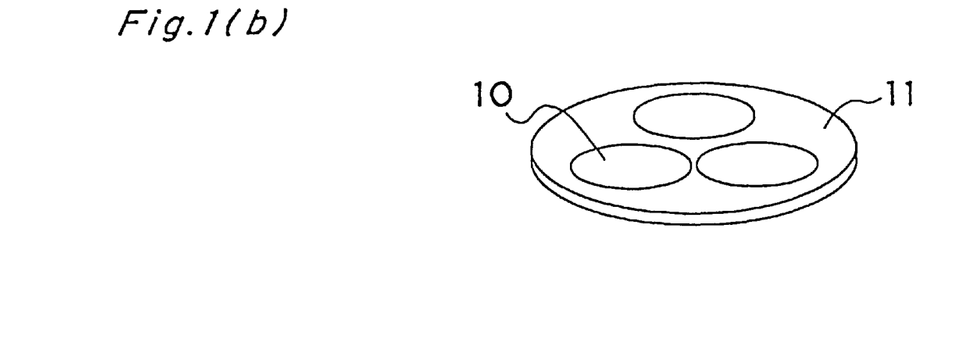
FIG. 1(b) is a perspective view illustrating a substrate holder for supporting substrates, which is used in the apparatus for forming the recording film as described above.

The optical recording medium is manufactured through the following steps:

First, a desired number (three in the embodiment shown in the drawing) of the polycarbonate substrates 10 each having a diameter of, for example, 120 mm are mounted onto the substrate holder 11, which is then conveyed into the loading chamber 1 with opening the introduction door 7.

Then, the gas in the loading chamber 1 is discharged to reach a given degree of vacuum, and the substrate holder 11 is conveyed to the surface treatment chamber 2 which has been already maintained at a given degree of vacuum. In the surface treatment chamber 2, a degassing treatment (or outgassing treatment) is carried out to remove volatile components (including moisture) adhering to the substrate by means of a heating lamp 12, and a surface modification treatment of the substrate (especially to improve the wettability of the substrate surface (an adhesion property between the substrate and the recording film)) is conducted by means of a discharging electrode 13.

The degassing treatment may be carried out, for example, by heating the substrate surface for about 10 seconds with a far infrared heater to a temperature, for example, of 80 to 120° C. to remove the moisture and the like adsorbed on the substrate. The surface modification treatment may be carried out, for example, by treating the substrate surface for about 10 seconds with a plasma generated by introducing oxygen and/or argon gas into the surface treatment chamber 2 and applying a high frequency voltage of 500 to 1500 V at 13.56 MHz to the discharging electrode 13.

Subsequently, the substrate holder 11 is conveyed to the recording film forming chamber 3 for forming the recording film of a pigment material, which is maintained at a given degree of vacuum. In the recording film forming chamber 3, the pigment material 14 of for example an azo based pigment material, a phthalocyanine based pigment maetrial, an anthraquinone based pigment material, or the like is deposited to a given thickness within the range of for example 0.1 to 0.3 $\mu$m. The degree of vacuum upon the vapor deposition of the pigment material is usually as high as $10^{-3}$ Torr or less. However, it is preferable to carry out the vapor deposition under a vacuum degree of $10^{-4}$ to $10^{-7}$ Torr, for example, $10^{-4}$ Torr, whereby the evaporation of the pigment material becomes more stable. The evaporation vessel 15 is made, for example, of a metal (such as molybdenum or tungsten), a ceramic material (such as alumina or silicon nitride), a metal of which surface is coated with a ceramic material, or a metal having an oxidized or nitrided surface. The evaporation vessel may have, for example, a hollow cylindrical form or rectangular parallelopiped form of which upper portion or top is opened, or a boat-like form.

The evaporation vessel 15 is adapted to allow to sense a temperature of a portion at which the pigment material is to be contact, for example, a central portion of the bottom surface of the vessel. For example, a thermocouple is embedded in the central portion of the bottom surface of the evaporation vessel to monitor the temperature of the evaporation vessel 15 successively. The temperature for heating the evaporation vessel is controlled so that the temperature thus monitored may be at a given temperature less than 2.5 times as high as the evaporation starting temperature of the pigment material. It is noted that the temperature near the substrate holder (hence, the temperature of the substrate) in the recording film forming chamber may usually be a room temperature or a temperature near the room temperature (for example, about 20 to 50° C., especially 30° C.).

Also, a vapor deposition rate monitor of a quartz oscillator type (not shown) is disposed near the position at which the substrate holder is located in the recording film forming chamber 3, thereby to monitor the thickness of the pigment material deposited on the substrate so as to calculate the deposition rate of the pigment material. A desired thickness of the pigment material can be obtained by adjusting the degree of heating the evaporation vessel in accordance with the calculated deposition rate. The temperature for heating the evaporation vessel is not necessarily always kept constant, so that it may be varied in accordance with the deposition rate as long as it is lower than 2.5 times as high as the evaporation starting temperature of the pigment material.

The evaporation of the pigment material is controlled by introducing the pigment material 14 into the evaporation vessel 15, heating the evaporation vessel 15 with a heater 16 while utilizing an electric energy so that the temperature of the evaporation vessel 15 may satisfy the heating condition of the present invention, for example, at a given temperature within the range of about 100 to 600° C., and adjusting the degree of heating while monitoring the thickness of the pigment material with the deposition rate monitor of the quartz oscillator type. The required temperature of the evaporation vessel may be suitably selected in accordance with the kind of the pigment material or the deposition rate as long as it does not exceed the temperature which is about 2.5 times as high as the evaporation starting temperature of the pigment material.

Subsequently, the substrate holder 11 is conveyed to the reflective film forming chamber 4, where a layer of a reflective film material (which may be a material generally used for the optical recording medium) is deposited onto the recording film. In the reflective film forming chamber 4, the reflecting film material 17 such as gold, silver, aluminum or the like is charged in another evaporation vessel 18. The reflecting film material 17 is heated and evaporated by a heater 19 using an electric energy to form the reflective film having a thickness of 0.05 to 0.1 $\mu$m thickness on the recording film. Upon forming the reflective film, any other suitable film-forming method utilizing vacuum, such as sputtering, ion plating, or plasma CVD, may be used.

Thereafter, the substrate holder 11 is conveyed to the withdrawal chamber 5, from which it is taken out by opening the withdrawal door 8 and sent to the next step, i.e. the protective film forming step to complete the optical recording medium. The protective film is formed by forming on the reflective film a layer of a material (for example, an ultraviolet cured resin) that is generally used in producing the optical recording medium.

It is to be noted that the present invention is mainly characterized by the predetermined temperature condition in the recording film forming chamber 3 upon the formation of the recording film of a pigment material.

Figure 2:
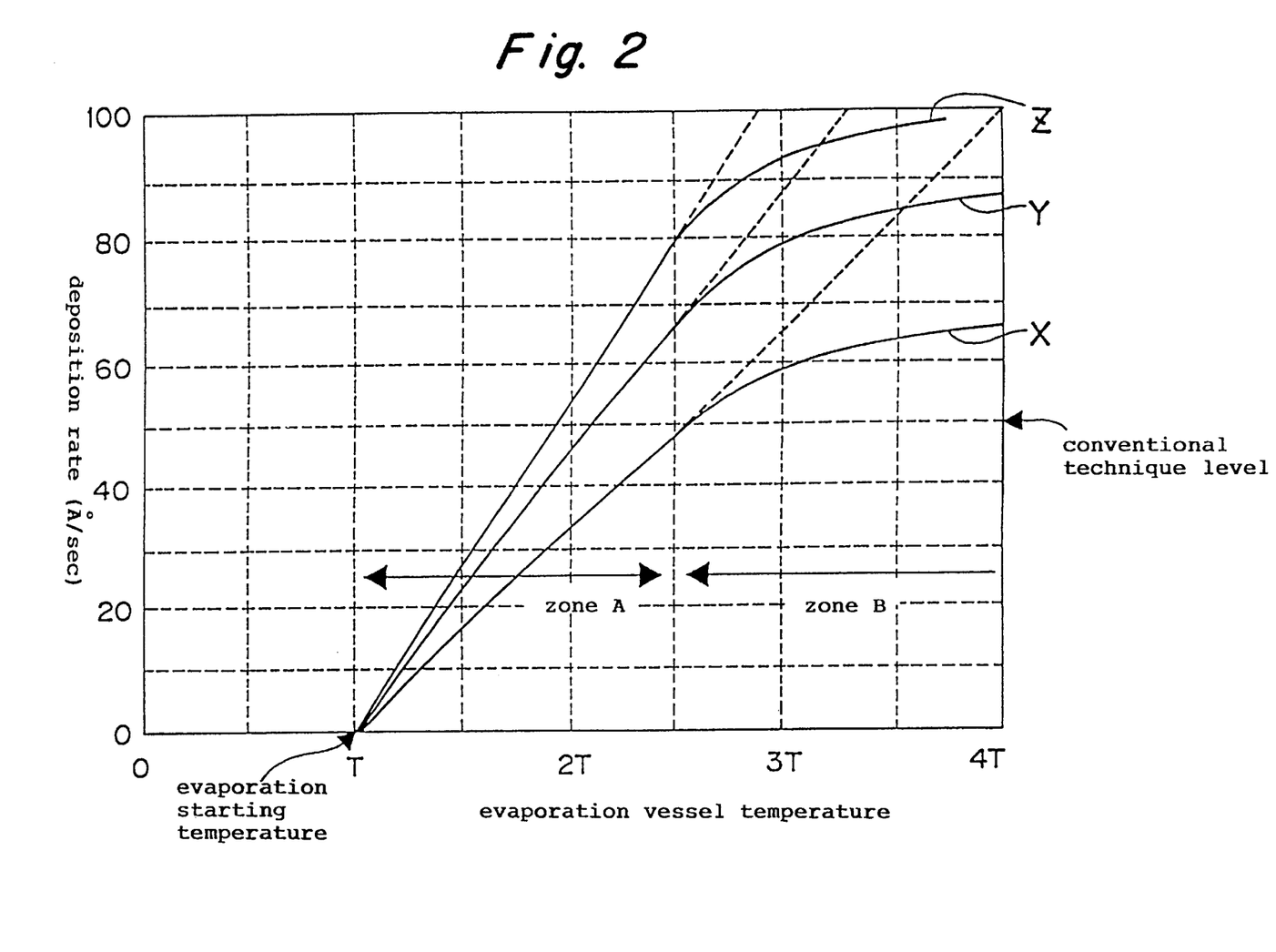
FIG. 2 is a graph showing a relationship between a temperature of an evaporation vessel (a ratio relative to a evaporation starting temperature) and a deposition rate of a pigment material with an emissivity of an evaporation vessel as a parameter.

FIG. 2 is a graph showing how the deposition rate of copper phthalocyanine, which is a phthalocyanine based pigment material, depends on the temperature of the evaporation vessel.

A boat 15 containing copper phthalocyanine powder 14 as the pigment material was introduced into the recording film forming chamber 3, where the pigment material was evaporated by adjusting an electric current passing through the boat to heat the evaporation vessel while monitoring the temperature of the bottom surface of the boat with which the powder is in contact (i.e. the temperature of the evaporation vessel) under a vacuum degree of $1\times10^{-4}$ Torr by means of a chromel-alumel thermocouple embedded in the bottom surface. It is noted that the temperature of and around the substrate was 50° C.

A speed of the film formation (a thickness of the film deposited on the substrate per second (Å/sec)) was obtained as the deposition rate (which also corresponds to the evaporation rate of the pigment material) with a film thickness meter (the deposition rate monitor) of the quartz oscillator type disposed near the substrate as described above. In FIG. 2, the temperature of the evaporation vessel is normalized using the evaporation starting temperature of the pigment material (T) (180° C. in the case of copper phthalocyanine). In other words, the temperature of the evaporation vessel is represented as a ratio relative to the evaporation starting temperature of the pigment material. Therefore, 2.5 T corresponds to the state in which the temperature of the evaporation vessel is 450° C. In FIG. 2, a conventional technique level refers to a recording film forming speed corresponding to a thickness of the film formed within a period of time required in the step for forming the recording film by the spin coating method. Namely, it means that the spin coating method can achieve a recording film forming speed of about 50 (Å/sec).

It is noted that X in FIG. 2 represents a case in which the emissivity of the surface of the evaporation vessel with which surface the pigment material is in contact is 0.1 (using a molybdenum boat); Y represents a case in which the emissivity is 0.2 (using a tantalum boat); and Z represents a case in which the emissivity is 0.3 (using a tungsten boat).

In the above-mentioned deposition experiment using copper phthalocyanine, splashes became conspicuous when the normalized temperature of the evaporation vessel exceeded about 2.8, yielding a product that involves a problem for practical use as an optical recording medium.

As is apparent from FIG. 2, the effect obtained by increasing the temperature of the evaporation vessel begins to decrease at the evaporation vessel temperature of about 2.5 T. Therefore, even if the temperature of the evaporation vessel is increased to above 2.5 T, it is not possible to obtain the effect in increasing the evaporation rate which is so good as the effect obtained at a temperature below 2.5 T. In other words, it is to be understood that the graph of FIG. 2 can be divided into two zones (zone A and zone B) at the evaporation vessel temperature of about 2.5 T. The zone A is a region in which the deposition rate increases in proportion to the evaporation vessel temperature, whereas the zone B is a region in which the increase of the deposition rate of the recording film to be formed begins to be saturated.

Although the deposition can be carried out at the evaporation vessel temperature at above about 2.5 T, the effect of increasing the evaporation vessel temperature is saturated or diluted, and a further increase of the evaporation vessel temperature may result in a problem that the pigment material is likely to splash. In fact, it has been observed that the frequency of the splash generation sharply increases when the film is formed in the zone B (especially when the temperature is above 2.8 T). Also, it is inferred that the phenomenon of the saturation of the deposition rate may be partly due to agglomeration of the pigment material causing adverse effects on its sublimation, partial change of the pigment material, fluctuation of the heat received by the pigment material when a powdery pigment is used, and the like, resulting in scattering of the pigment material as splashes.

Therefore, it is preferable to perform the film formation in the zone A in order to obtain the recording film having stabilities in its quality and performance. In fact, a recording film with improved quality and performance is produced in the zone A.

It has been found out that the above-mentioned relationships of the evaporation vessel temperature with the deposition rate and with the recording film quality are present also in the cases of organic pigment materials (some of the constituent elements of the material may be metal elements) other than phthalocyanine based materials, for example, azo, anthraquinone, pyridylazo, porphyrin, perylene, quinacridone, and pyrrolopyrrole based pigment materials. Therefore, in producing the optical recording medium, it is generally considered preferable to form the recording film by maintaining the specific relationship between the temperature of the evaporation vessel and the evaporation starting temperature of the pigment material.

Further, as is apparent by comparison of the curves X, Y, and Z, a larger emissivity of the surface of the evaporation vessel with which surface the pigment material is in contact gives a larger deposition rate. Therefore, it is more preferable to use an evaporation vessel made of a material having a larger emissivity, whereby it is possible to achieve a deposition rate with which the recording film can be formed in a period of time approximately equal to or more preferable than the period of time required in the conventional formation process, and also the splashes can be suppressed so that an optical recording medium with improved quality can be produced. This seems to be due to the fact that the larger emissivity increases the efficiency of heat transfer to the pigment material, thereby decreasing the degree of unbalance between the temperature of the evaporation vessel and the temperature of the pigment material.

Further, when the evaporation vessel itself is directly heated by Joule's heat generated by allowing an electric current to pass through the evaporation vessel, it provides an advantage that the speed of heat transfer to the pigment material is increased, thereby improving the evaporation response and facilitating the control of the evaporation of the pigment material.

In a more preferable embodiment of the method for producing an optical recording medium by vacuum vapor deposition, a more suitable recording film can be obtained by adjusting a shape of the evaporation vessel for evaporating the pigment material, a positional relationship between the substrate holder and the evaporation vessel, a shielding plate for thickness correction, or the like in addition to adjustment of the above-mentioned relationship between the temperature of the evaporation vessel and the evaporation starting temperature of the pigment material in order to ensure the uniformity of the surface of the recording film on the substrate.

In addition, when a mechanism of rotating and revolving the substrates, i.e. a mechanism in which the substrate holder itself is rotated around its center (hence, the substrates revolve around the center of the substrate holder) and each of the substrates held by the substrate holder is rotated around its respective center, is provided in the substrate holder, it can be effective in suppressing the fluctuations of the properties of the recording film among the substrates within the same batch.

Further, uniformity of the recording film among lots can be further improved by providing an optical-type monitor having a higher accuracy in addition to the monitor of the quartz oscillator type, and or by providing a shutter mechanism for control of the recording film thickness.

Figure 3:
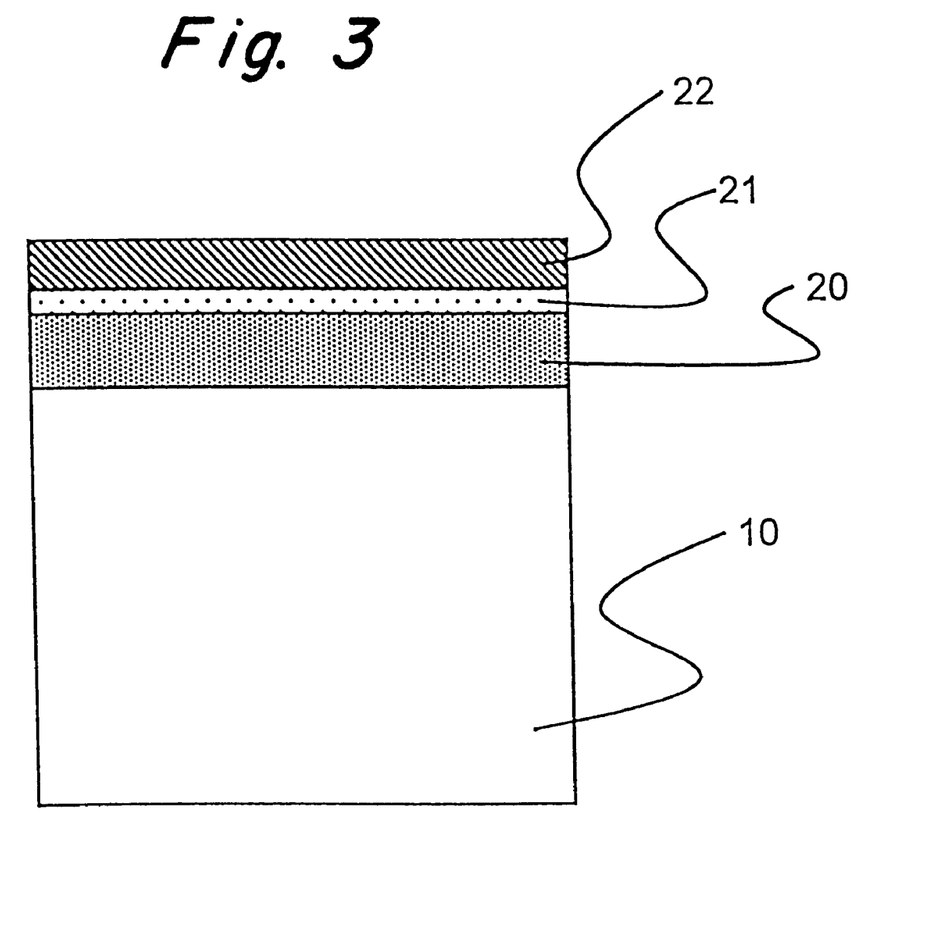
FIG. 3 is a schematic cross-sectional view illustrating an example of a structure of a portion of an optical recording medium formed in accordance with the present invention.

FIG. 3 shows a schematic cross-sectional view illustrating a structure of the optical recording medium produced as described above. The optical recording medium has a laminate structure including a plastic substrate 10 made of a polycarbonate (PC), a polymethyl methacrylate resin (PMMA), or the like, a recording film 20 made of the pigment material, a reflective film 21, and a protective film 22. A printing layer displaying various indications depending on needs may be optionally formed on the protective film 22.

With respect to the optical recording medium produced by the method of the present invention, in obtaining the above-mentioned results shown in FIG. 2, the thickness of the recording film 20 of the pigment material in the optical recording medium formed by using a molybdenum boat with the heating temperature of the evaporation vessel of 370° C. was measured by means of a stylus based surface profiler (a step difference type film thickness meter). When the aimed thickness was 0.1 µm, the variation of the film thickness was within ±10%. When the apparatus was combined with the rotation/revolution mechanism, the variation of the film thickness was within ±5%.

Further, the surface of the produced optical recording medium was observed by an optical microscope and an error rate was measured by an electrical property evaluation device. The results confirmed that the optical recording medium including the recording film formed under the condition of the A zone had a dust adhesion amount smaller by more than one order as compared with the optical recording medium including the recording film formed under the condition of the B zone and, in accordance therewith, the error rate was smaller by more than one order.

In contrast, for comparison, a recording film was formed by applying a pigment material with a spin coater, with the result that the variation was 20 to 30% when the aimed thickness was 0.1 µm, and 10 to 20% when the aimed thickness was 0.2 µm. In this formation, the period of time required for the coating process was 20 to 30 seconds.

It is noted that the details of the examples of producing the optical recording media by the vapor deposition carried out for preparing the graph shown in FIG. 2 and the examples of producing the optical recording media by the spin coater, as well as the methods of evaluating the produced optical recording media are as follows:

(1) Example of producing optical recording medium by vapor deposition (pigment material:copper phthalocyanine)

(i) Example in A zone

An evaporation vessel (molybdenum boat) into which copper phthalocyanine was charged was heated by passing an electric current of 80 A through the evaporation vessel (under a pressure of 3×10$^{-5}$ Torr). When the temperature of the evaporation vessel reached 370° C., a shutter was opened so as to deposit the pigment material on the substrate so that a recording film was formed. The deposition rate at this moment was 35 Å/sec. The obtained substrate was taken out for counting the number of splashes in a given area (10 cm$^2$) with a magnifying glass, and 7 splashes were observed.

Thereafter, gold (Au) was deposited to a thickness of 1000 Å as the reflective layer, and the obtained substrate was taken out. Finally, an ultraviolet-curable resin SD-301 (manufactured by Dainippon Ink and Chemicals, Inc.) was formed to a thickness of 5 to 10 µm as the protective film by means of the spin coating method and cured in an ultraviolet curing furnace to produce the optical recording medium.

The produced optical recording medium was evaluated with a CD-R tester (manufactured by Pulsteck Industrial Co., Ltd.), and a block error rate was found to be 40 cps.

(ii) Example in B zone

The same pigment as in the above example (i) was charged into the same evaporation vessel as in the above example (i). The evaporation vessel was heated by passing an electric current of 110 A through the evaporation vessel. When the temperature of the evaporation vessel reached 550° C., a shutter was opened to deposit the pigment material on the substrate and thereby to form a recording film. The deposition rate at this moment was 60 Å/sec. The obtained substrate was taken out for counting the number of splashes in the same manner as in the example (i), with the result that 70 splashes were observed.

Further, an optical recording medium was produced and evaluated in the same manner as in the example (i), resulting in the block error rate of 300 cps, which means the presence of a quality problem as an optical recording medium.

(2) Example of producing optical recording medium by spin coating method

A cyanine based pigment OM55 (manufactured by Fuji Photo Film Co., Ltd.) was dissolved in ethyl cellosolve to obtain a solution of 4 wt %, which was applied onto the substrate by a spin coater and dried to give a recording layer. Thereafter, gold (Au) was deposited to a thickness of 1000 Å by sputtering to form the reflective layer, followed by forming the protective film in the same manner as above so as to produce the optical recording medium.

(3) Method of measuring the film thickness

As a method for evaluating the film thickness of a completed disk, a cut surface of the disk was observed and evaluated by a scanning electron microscope (SEM).

Further, optical recording media were produced by using other pigment materials and forming a recording film on the substrate in the same manner as above. The quality of each optical recording medium was evaluated to find a critical evaporation vessel temperature at which the quality begins to be affected (Tc, i.e. the quality of the optical recording medium is affected if the heating temperature of the evaporation vessel exceeds Tc). The results are shown in the following Table 1 together with the evaporation starting temperature (T) at which the pigment material starts to evaporate. It is noted that the influence on the quality was determined by observing the presence/absence and the number of splashes by visual observation using a magnifying glass as mentioned above and by examining whether the block error rate of the obtained optical recording medium was 220 cps or not.

TABLE 1

| Pigment material | Evaporation starting Temp. (° C., T) | Critical Temp. (° C., Tc) | T/Tc |
|---|---|---|---|
| Copper phthalocyanine (manufactured by TOKYO KASEI KOGYO Co., Ltd.) | 180 | 500 | 2.8 |
| Zinc bis[1-(4-methyl-2-pyridylazo)-2-naphtholate] *a) | 170 | 420 | 2.5 |
| 5,10,15,20-tetrakis(4-trifluoro-phenyl)21H,23H porphyrin (manufactured by Aldrich) | 175 | 440 | 2.5 |
| Merocyanine NK2045 (manufactured by Nippon Kankoh-Shikiso Kenkyusho) | 120 | 320 | 2.7 |
| Rhodamine B (manufactured by TOKYO KASEI KOGYO Co., Ltd.) | 130 | 330 | 2.5 |
| 5,10,15,20-tetrakis(4-methoxy-phenyl)porphyrin cobalt(II) (manufactured by Aldrich) | 180 | 460 | 2.6 |
| Pigment Violet GE3315 (perylene based pigment) (manufactured by Sanyo Color | 220 | 550 | 2.5 |

TABLE 1-continued

| Pigment material | Evaporation starting Temp. (° C., T) | Critical Temp. (° C., Tc) | T/Tc |
|---|---|---|---|
| Works Ltd.) | | | |
| Pigment Red GE3301 (quinacridone based pigment) (manufactured by Sanyo Color Works Ltd.) | 260 | 680 | 2.6 |
| Pigment Red GE3312 (pyrrolopyrrole based pigment) (manufactured by Sanyo Color Works Ltd.) | 200 | 520 | 2.6 |
| α,α,α,α-tetrakis (2,2,3,3,3-pentafluoropropoxy)copper phthalocyanine *b) | 170 | 430 | 2.5 |
| α,α,α,α-tetrakis [2-(trifluoro methyl)phenoxy]zinc phthalocyanine *c) | 150 | 420 | 2.8 |

*a) Process for preparing zinc bis[1-(4-methyl-2-pyridylazo)-2-naphtholate]:

(1) Synthesis of 1-(4-methyl-2-pyridylazo)-2-naphthol

A reaction flask was loaded with 16 g of 2-amino-4-methylpyridine, 50 ml of ethanol, and 11 g of sodium ethoxide. Into the mixture, 17 g of isopentyl nitrite was dropwise added in 30 minutes with stirring.

After the mixture was further stirred for one hour, heating was started and the mixture was stirred at a temperature of 75 to 80° C. for three hours. After the heating was stopped and the reaction liquid was cooled to room temperature, a solution of 13 g of 2-naphthol in 15 ml of ethanol was dropwise added in 50 minutes.

After the resultant mixture was stirred for one hour at room temperature and further heated and stirred at 75 to 80° C. for two hours, the heating was stopped and the resultant was left to stand overnight. Then, the reaction liquid was filtrated to remove insoluble components, and the filtrate was condensed in an evaporator for solidification. The obtained solid was dissolved in 100 ml of ethyl acetate and was successively washed with an aqueous solution of sodium hydroxide and with water. The obtained ethyl acetate phase was condensed in an evaporator, and the residue was crystallized by addition of methanol. The resultant was collected after filtration and dried to yield 2.7 g of a reddish orange crystal.

(2) Synthesis of zinc bis[1-(4-methyl-2-pyridylazo)-2-naphtholate]

A reaction flask equipped with a cooling tube and a stirrer was loaded with 1.1 g of the azo pigment obtained in the above step (1), 0.45 g of zinc acetate dihydrate, and 25 ml of methanol, and the mixture was stirred at a temperature of 55 to 60° C. for three hours.

The heating was stopped and the mixture was cooled to room temperature and 10 ml of water was added, followed by filtration to give a reddish violet crude crystal. The obtained crystal was put into 20 ml of methanol, which was then stirred under heating for two hours; and the resultant was cooled, filtrated, and dried to yield 1.0 g of a purified crystal.

*b) Process for preparing α,α,α,α-tetrakis(2,2,3,3,3-pentafluoropropoxy)copper phthalocyanine:

(1) Synthesis of 3-(2,2,3,3,3-pentafluoropropoxy)phthalonitrile

A reaction flask was loaded with 8.7 g of 3-nitrophthalonitrile, 9.0 g of 2,2,3,3,3-pentafluoropropanol, 13.8 g of anhydrous potassium carbonate, and 350 ml of dimethyl sulfoxide, and the temperature was raised to 50° C. with stirring under nitrogen flow. After stirring at 50° C. for 4 hours, the heating was stopped. The reaction liquid was cooled and added into 500 ml of water, and the precipitated crystal was collected and dried to yield 13.2 g of the intended compound.

(2) Synthesis of α,α,α,α-tetrakis(2,2,3,3,3-pentafluoropropoxy)copper phthalocyanine Then, a reaction flask was loaded with 13.1 g of the above phthalonitrile derivative, 90 ml of 1-pentanol, 10.8 g of 1,8-diazabicyclo[5,4,0]-7-undecene (DBU), and 1.5 g of cuprous chloride, and the temperature was raised to 110° C. with stirring under nitrogen flow. After stirring at that temperature for 5 hours, the heating was stopped. The reaction liquid was added into 400 ml of methanol, and the precipitated crystal was filtration collected and dried to yield 10.1 g of a crude product. This crude product was dissolved in 800 ml of dioxane and the temperature of the obtained solution was raised to 60° C. with stirring. Then, 1 g of active china clay was added and the obtained mixture was stirred for 30 minutes. Then, after the active china clay phase was removed by filtration, the filtrate was condensed and dried in an evaporator for solidification. The obtained solid was dispersed in 400 ml of methanol and filtrated to produce a crystal, which was dried to obtain 3.3 g of the intended compound α,α,α,α-tetrakis(2,2,3,3,3-pentafluoropropoxy)copper phthalocyanine.

*c) Process for preparing α,α,α,α-tetrakis[2-(trifluoromethyl)phenoxy]zinc phthalocyanine (1) Synthesis of 3-[2-(trifluoromethyl)phenoxy]phthaionitrile A reaction flask equipped with a cooling tube was loaded with 8.7 g of 3-nitrophthalonitrile, 9.4 g of 2-(trifluoromethyl)phenol, 13.8 g of anhydrous potassium carbonate and 350 ml of dimethyl sulfoxide, and the temperature was raised to 50° C. with stirring under nitrogen flow. After stirring at 50° C. for three hours, the heating was stopped. The reaction liquid was cooled and added into 500 ml of water, and the precipitated crystal was collected and dried to yield 13.5 g of the intended compound.

(2) Synthesis of α,α,α,α-tetrakis[2-(trifluoromethyl)phenoxy]zinc phthalocyanine Then, a reaction flask equipped with a cooling tube was loaded with 3.5 g of the above phthalonitrile derivative, 18 ml of 1-pentanol, 2.7 g of 1,8-diazabicyclo[5,4,0]-7-undecene (DBU), and 0.4 g of zinc chloride. After the mixture was stirred at 110° C. under nitrogen flow for 5 hours, the heating was stopped. The reaction liquid was added into 200 ml of methanol and, further, 40 ml of water was added. The precipitated crystal was filtration collected and dried to yield 1.8 g of a crude product.

This crude product was purified by column chromatography (silica gel/toluene:ethyl acetate=40:1) to obtain 1.6 g of the intended compound α,α,α,α-tetrakis[2-(trifluoromethyl)phenoxy]zinc phthalocyanine.

Industrial Applicability

As described above, the present invention employs the method in which the temperature of the evaporation vessel for heating the pigment material in vapor depositing the pigment material on the substrate is not more than 2.5 times as high as the evaporation starting temperature of the pigment material. This method suppresses splashes and reduces the amount of dust adhesion, thereby decreasing the errors caused by the dust and thus providing the optical recording medium with improved quality.

Also, it is possible to obtain uniformity of, for example, less than about +10% in the thickness of the recording film over the entire surface of a single optical recording medium and to obtain uniformity of the same level among different optical recording media. This can suppress the fluctuation of electric performance, such as variation in output of the optical recording medium and variation in the optimal power for the optical recording medium, due to insufficient uniformity of the thickness of the recording film.

Further, the recording film can be formed approximately within the same period of time as required in forming the recording film by means of the conventional method (the spin coating method) (for example, 20 to 30 seconds). Therefore, the present invention provides a great practical value in manufacturing optical recording media through a dry process.

What is claimed is:

1. A method of producing an optical recording medium by an apparatus with plural chambers under high vacuum comprising:

heating an evaporation vessel containing a pigment material in one of the chambers, evaporating the pigment material, forming a recording film by depositing the evaporated pigment material onto a substrate, forming a reflective film on the recording film in another one of the chambers, and wherein the evaporation vessel is heated to a temperature which is not less than 1.5 times as high as an evaporation starting temperature of the pigment material and which is not more than 2.5 times as high as the evaporation starting temperature of the pigment material.

2. The method according to claim 1, wherein at least a surface of the evaporation vessel which surface is in contact with the pigment material has an emissivity of at least 0.1.

3. The method according to claim 2, wherein the evaporation vessel comprises at least one of molybdenum, tantalum and tungsten.

4. The method according to claim 1, wherein the evaporation vessel itself is heated by passing an electric current through the evaporation vessel.

5. The method according to claim 1, further comprising a step of forming a protective film on the reflective film.

6. The method according to 1, further comprising rotating and revolving the substrates on a substrate holder, wherein the substrate holder itself rotates around its center and each of the substrates held by the substrate holder rotates around its respective center.

7. The method according to claim 2, further comprising rotating and revolving the substrates on a substrate holder, wherein the substrate holder itself rotates around its center and each of the substrates held by the substrate holder rotates around its respective center.

8. The method according to claim 3, further comprising rotating and revolving the substrates on a substrate holder, wherein the substrate holder itself rotates around its center and each of the substrates held by the substrate holder rotates around its respective center.

9. The method according to claim 4, further comprising rotating and revolving the substrates on a substrate holder, wherein the substrate holder itself rotates around its center and each of the substrates held by the substrate holder rotates around its respective center.

10. The method according to claim 5, further comprising rotating and revolving the substrates on a substrate holder, wherein the substrate holder itself rotates around its center and each of the substrates held by the substrate holder rotates around its respective center.

* * * * *